Jan. 30, 1968     N. E. EDWARDS     3,366,424

CONTROL VALVE

Filed June 16, 1966

INVENTOR
NORMAN E. EDWARDS
BY
*Joseph E. Papin*

United States Patent Office 3,366,424
Patented Jan. 30, 1968

3,366,424
CONTROL VALVE
Norman E. Edwards, Bridgeton, Mo., assignor, by mesne assignments, to Wagner Electric Corporation, South Bend, Ind., a corporation of Delaware
Filed June 16, 1966, Ser. No. 558,014
5 Claims. (Cl. 303—52)

ABSTRACT OF THE DISCLOSURE

A hydraulic control valve having a pair of valve means controlling pressure fluid communication between a pair of port sets where in one valve means is actuated by an applied force responsive member and the other valve means is actuated by a fluid pressure responsive member, and passage means in said one valve means for subjecting the fluid pressure responsive member to the fluid pressure established by said one valve means.

---

Figure 1:
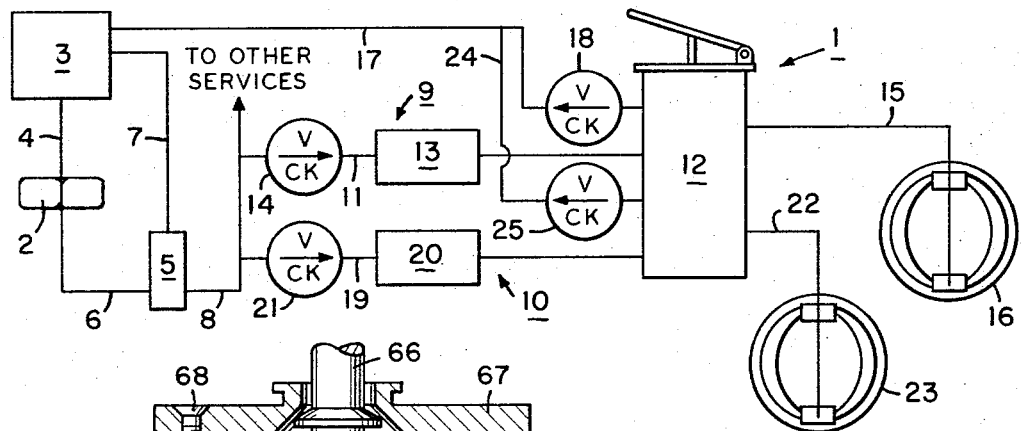

This invention relates to control valves and in particular to tandem type control valves for controlling fluid pressure in a system having separate branches.

In the past, tandem control valves have been provided with a linkage arrangement between the valve control members or reaction means so that an operator applied force to one of the reaction means was transmitted through a special link to the other reaction means to operatively move the separate valving controlling pressure fluid flow in the fluid pressure branches. However, this linkage type of reaction means and valving arrangement had the undesirable feature that the reaction forces which provide for "feel" as to the extent of braking effort were transmitted through the one reaction means and from the other reaction means through the special link and said one reaction means to the operator, thereby effecting variations in the "feel" and controllability of the brake application. In other prior art tandem control valves, an expansible fluid pressure chamber was defined between one of the reaction means and a supplemental member fixedly connected to said control valve so that fluid pressure flow through one of the fluid pressure branches also flowed into the expansible chamber and actuated said one reaction means to operatively move the valve controlling fluid pressure flow through the other fluid pressure branch. One of the undesirable features of these prior art control valves was that it was necessary to provide an extra element or wall in the control valve to serve as the fixed portion of the expansible chamber, and also it was necessary to provide a special passage through the housing of the control valve for connecting the fluid pressure flow through the one branch with the expansible chamber.

It is an object of the present invention to provide a control valve which overcomes the aforementioned undesirable features.

Another object of the present invention is to provide a control valve which defines an expansible fluid pressure chamber between the valve controlling fluid pressure flow in one fluid pressure branch and the valve control member which operatively moves the valve controlling fluid pressure flow in the other fluid pressure branch.

Another object is to provide a control valve with a passage through the valve controlling pressure fluid flow in one fluid pressure branch, said passage connecting the established fluid pressure flow through the one fluid pressure branch with an expansible fluid pressure chamber, and the established fluid pressure in said chamber serves to actuate the valve control member which controls the pressure fluid flow valve in the other fluid pressure branch.

These and other objects and advantages will become apparent hereinafter.

Briefly, the invention embodies a control valve having separate valving means therein for controlling the application of fluid pressure from a fluid pressure source to a pair of servo motors, respectively, wherein one of said valving means is responsive to an applied force to establish pressure fluid flow between said fluid pressure source and one of said servo motors, and the other of said valving means is responsive to the establishment of pressure fluid flow between said source and said one servo motor to establish pressure fluid flow between said source and the other of said servo motors.

Figure 2:
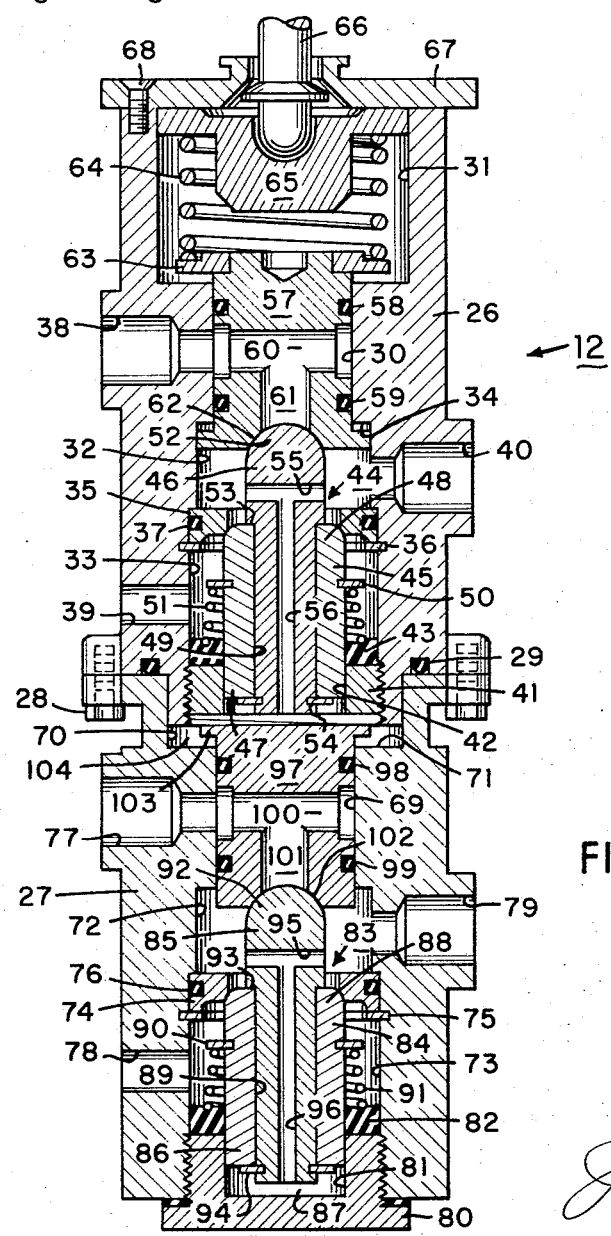

In the drawings which illustrate embodiments of the present invention,

FIG. 1 is a diagrammatic view of a fluid pressure system having a control valve therein embodying the present invention, and FIG. 2 is a sectional view showing the control valve of FIG. 1 in cross-section.

Referring to the drawings in detail and in particular to FIG. 1, a fluid pressure system 1 is provided with a fluid pressure generating means 2 having the suction side thereof connected to a reservoir 3 by a conduit 4 and the pressure side thereof connected to an unloading valve 5 by a conduit 6. Said unloading valve is also connected to the reservoir 3 by another conduit 7. A conduit 8 has one end connected to the unloading valve 5 and the other end thereof connected to other services (not shown), and the fluid pressure system 1 separates or divides into a pair of fluid pressure branches, indicated generally at 9 and 10, which connect with the conduit 8. The fluid pressure branch 9 includes a conduit 11 connected in parallel circuit relation between the conduit 8 and one of a pair of inlet ports in a tandem or control valve 12, and a branch accumulator 13 and check valve 14 are interposed in the conduit 11 with said check valve providing unidirectional pressure fluid flow through the conduit 11 to said accumulator. Another conduit 15 connects an outlet port of the control valve 12 with one of the axle sets of servo motors or brake assemblies 16, and fluid pressure is exhausted from the fluid pressure branch 9 by an exhaust conduit 17 connected between an exhaust port of said control valve and the reservoir 3, and said exhaust conduit has a check valve 18 interposed therein which permits unidirectional pressure fluid flow from said control valve to said reservoir. The fluid pressure branch 10 includes a conduit 19 connected in parallel circuit relation between the conduit 11 and the other inlet port of the control valve 12, and a branch accumulator 20 and check valve 21 are interposed in the conduit 19 with said check valve providing unidirectional pressure fluid flow through the conduit 19 to said accumulator. A conduit 22 connects another outlet port of the control valve 12 with the other axle set of servo motors or brake assemblies 23, and fluid pressure in the branch 12 is exhausted by an exhaust conduit 24 having one end connected to another exhaust port in the control valve 12 and the other end thereof connected to the conduit 17 between the reservoir 3 and the check valve 18, and another check valve 25 is provided in the exhaust conduit 24 permitting unidirectional pressure fluid flow from said control valve to said reservoir.

Referring now to FIG. 2, the control valve 12 is provided with an upper housing 26 which is connected to a lower housing 27 by suitable means, such as a plurality of studs 28, and a sealing ring 29 is sealably interposed between said upper and lower housings.

The upper housing 26 is provided with an axial bore 30 in the mid-portion thereof, and a counterbore 31 connects with the upper end of the bore 30 and extends through the top of said upper housing, and stepped counterbores 32, 33 connect with the lower end of the bore 30 and extend through the lower end of said upper housing, and an annular shoulder 34 is defined at the juncture of said bore and the counterbore 32. A disc or washer-shaped valve seat member 35 is provided in the larger counterbore 33 and is held in abutting engagement with the annular shoulder defined at the juncture of the counterbores 32, 33 by a stop ring and groove assembly 36 in said larger counterbore adjacent to said shoulder, and a sealing ring 37 on said valve seat member sealably engages said larger counterbore. An exhaust port 38 which receives the conduit 17, as previously mentioned, is provided in the upper housing 26 connecting with the bore 30, and inlet and outlet ports 39, 40 which receive the conduits 11, 15, respectively, as previously mentioned, are provided in said upper housing connecting with the larger counterbore 33 adjacent to the mid-portion thereof and with the smaller counterbore 32 adjacent to its mid-portion, respectively. A valve guide member 41 having a bore 42 extending therethrough is threadedly received in the lower end of the counterbore 33, and an annular sealing member 43 is seated against said valve guide member in circumscribing relation with the bore 42.

A valve element indicated generally at 44 comprises a pair of concentrically aligned and concertedly movable valve members 45, 46. The larger valve member 45 has its lower end 47 slidable in the valve guide member bore 42, and the annular seal 43 is in sealing engagement with the periphery of the valve member 45 and the counterbore 33. The other end of the valve member 45 defines thereon a sealing portion 48 for sealing engagement with the valve seat member 35, and an axial bore 49 extends through the opposed ends 47, 48 of the valve member 45. A snap ring and groove assembly 50 is provided on the valve member 45 intermediate the sealing portion 48 and the end 47, and a return spring 51 concentrically aligned with said valve member is biased between the annular seal 43 and the snap ring 50 normally urging the sealing portion 48 into sealing engagement with the valve seat member 35. The smaller valve member 46 is received in the bore 49 of the larger valve member 45, and the upper end of said smaller valve member defines a sealing portion 52 thereon. An abutment shoulder 53 is provided on the valve member 46 near the sealing portion 52 for abutting engagement with the upper end 48 of the valve member 45, and the lower end of the smaller valve member 46 extends through the end 47 of the larger valve member 45 and is retained against displacement by a spring clip 54 thereon so that there is little or no relative movement between the valve members 45, 46. A cross-passage 55 is provided through the valve member 46 intermediate the sealing portion 52 and the abutment shoulder 53, and an axial passage 56 has one end connected with said cross-passage and the other end thereof extending through the lower end of the valve member 46. It should be understood that in the illustrated embodiment, the valve element 44 is constructed of two members to reduce concentricity problems in aligning the sealing portions during manufacture but that one member could be used.

A stepped reaction piston or valve control member 57 is slidably received in the bore 30 and has peripheral seals 58, 59 thereon in sealing engagement with said bore. The opposed ends of the valve control member 57 extend into the counterbores 31, 32, respectively, and the larger or lower end thereof is abuttingly engageable with the annular shoulder 34 to limit the upward movement of said valve control member. A cross-passage 60 is provided through the valve control member 57 between the seals 58, 59 and is normally in substantial alignment with the exhaust port 38, and an axial passage 61 connects with said cross-passage and extends through the lower end of said valve control member defining a valve seat 62 thereabout for sealing engagement with the sealing portion 52 of the valve element 44. A retainer or force receiving plate 63 is urged into abutting engagement with the upper end of the valve control member 57 by a metering spring 64 which is biased between said force receiving plate and an application member 65 movable in the counterbore 31. The application member 65 is movable in response to movement of an operator-controlled push rod 66 engageable therewith, and said application member and said push rod are retained against displacement from the counterbore 31 by a flange member 67 which is connected to the upper end of the housing 26 by suitable means, such as studs 68.

The lower housing 27 is provided with a bore 69, and a counterbore 70 extending through the top of said housing substantially coaxial with the counterbore 33 in the upper housing 26 connects with the upper end of said bore and defines an annular shoulder 71 at the juncture thereof. Stepped counterbores 72, 73 are provided in the lower housing 27 connecting with the lower end of the bore 69 and extending through the bottom of said lower housing. A disc or washer-shaped valve seat member 74 is provided in the larger counterbore 73 and is held in abutting engagement with the annular shoulder defined at the juncture of the counterbores 72, 73 by a stop ring and groove assembly 75 in said larger counterbore adjacent to said shoulder, and an annular seal 76 on said valve seat member sealably engages said larger counterbore. An exhaust port 77 which receives the conduit 24, as previously mentioned, is provided in the housing 27 connecting with the bore 69, and inlet and outlet ports 78, 79 which receive the conduits 19 and 22, respectively, as previously mentioned, are provided in said lower housing connecting with the larger counterbore 73 adjacent to the mid-portion thereof and with the smaller counterbore 72 adjacent to its mid-portion, respectively. A valve guide or plug member 80 having an axially extending recess 81 therein is threadedly received in the lower end of the counterbore 73, and an annular seal is seated against said valve guide member in circumscribing relation with the recess 81.

Another valve element, identical to the valve element 44, as previously described, is indicated generally at 83 and comprises a pair of concentrically aligned and concertedly movable valve members 84, 85. The larger valve member 84 has its lower end 86 slidable in the valve guide recess 81 and the annular seal 82 is in sealing engagement with the periphery of the valve member 84 and the counterbore 73, and a fluid pressure chamber 87 is defined between the valve element end 86 and said valve guide member recess. The other end of the valve member 84 defines thereon a sealing portion 88 for sealing engagement with the valve seat member 74, and an axial bore 89 extends through the opposed ends 86, 88 of the valve member 84. A snap ring and groove assembly 90 is provided on the valve member 84 intermediate the sealing portion 88 and the end 86, and a return spring 91 concentrically aligned with said valve member is biased between the annular seal 82 and snap ring 90 normally urging the sealing portion 88 into sealing engagement with the valve seat member 74. The smaller valve member 85 is received in the bore 89 of the larger valve member 84 and the upper end of said smaller valve member defines a sealing portion 92 thereon. An abutment shoulder 93 is provided on the valve member 85 near the sealing portion 92 for abutting engagement with the upper end 88 of the valve member 84, and the lower end of the smaller valve member 85 extends through the large valve member end 86 and is retained against displacement by a spring clip 94 thereon so that there is little or no relative movement between the valve members 84, 85. A cross-passage 95 is provided through the valve element 85 intermediate the sealing portion 92 and the abutment shoulder 93, and an axial pasasge 96 has one end connected with said cross-passage and the other end thereof extending through the lower end of the valve member 85 and connecting with the fluid pressure chamber 87.

Another reaction piston or valve control member 97 is slidably received in the bore 69 and has peripheral seals 98, 99 thereon in sealing engagament with said bore. A cross-passage 100 is provided through the valve control member 97 between the seals 98, 99 and is normally in substantial alignment with the exhaust port 77, and an axial passage 101 connects with said cross-passage and extends through the lower end of said valve control member defining a valve seat 102 thereabout for sealing engagement with the sealing portion 92 of the valve element 83. The upper end of the valve control member 97 is provided with an enlarged head portion 103 movable in the counterbore 70 for lost motion engagement with the lower end of the valve element 44 as described hereinafter, and said head portion is abuttingly engageable with the annular shoulder 71 on the lower housing 27 and with the valve guide member 41 which defines another shoulder on the upper housing 26 to limit the downward and upward movement of said valve control member.

To complete the description of the control valve 12, it should be noted that an expansible fluid pressure chamber 104 is defined in the counterbore 70 between the lower end of the valve element 44 and the upper end of the valve control member 97 and that said expansible chamber is in pressure fluid communication with the counterbore 32 and the outlet port 40 through the axial passage 56 and the cross-passage 55 in the valve element 44 and that the fluid pressure chamber 87 is in pressure fluid communication with the counterbore 72 and the outlet port 79 through the axial passage 96 and the cross-passage 95 in the valve element 83. Since the effective areas of the lower ends of the valve elements 44, 83 are substantially equal to the effective areas of the inlet sealing portions 48, 88, the fluid pressure at the inlet ports 39, 78 does not establish a "head" force on said valve elements resisting the movement thereof, and the compressive forces of the springs 51, 91 maintain said sealing portions in sealing engagement with the valve seat members 35, 74, respectively.

Also, it should be noted that the pressure fluid communication between the inlet and outlet ports 39, 40 and 78, 79 for the application of fluid pressure in the branches 9 and 10 is controlled by the inlet valve portions 48, 88 and the valve seat members 35, 74, respectively, and that pressure fluid communication between the outlet and exhaust ports 40, 38 and 79, 77 for the exhaustion of pressure fluid from said branches is controlled by the outlet valve portions 52, 92 and the valve seats 62, 102 on the valve control members 57, 97, respectively. When the push rod 66 is in its released position and the fluid pressure in the brake assemblies 16, 23 has been exhausted, the valve seats 62, 102 on the valve control members 57, 97 are lightly sealably poised on the outlet sealing portions 52, 92 due to the weight of said valve control members.

Under the above conditions, pressure fluid normally flows from the reservoir 3 through the conduit 4 to the fluid pressure generating means 2 and is discharged therefrom through the conduit 6, unloading valve 5, conduit 8 and therefrom through the conduit 11, check valve 14 and into the accumulator 13 of the branch 9, and through the conduit 19, check valve 21 and into the accumulator 20 of the branch 10. Upon the establishment of a predetermined maximum fluid pressure in the accumulators 13, 20, the unloading valve 5 is actuated to by-pass the pressure fluid from the fluid pressure generating means 2 through the by-pass conduit 7 to the reservoir 3, and if the fluid pressure in said accumulators is decreased below the predetermined value, the unloading valve 5 will again function to establish pressure fluid communication between the fluid pressure generating means 2 and said accumulators.

In the normal operation of the control valve 12, an operator-applied force to the push rod 66 urges the application member 65 downwardly to compress the metering spring 64 and transmit a downward force through said spring and reaction plate 63 to the valve control member 57. This downward movement of the valve control member 57 sealably engages the valve seat 62 with the outlet valve portion 52 to interrupt pressure fluid communication between the outlet and exhaust ports 40, 38 and serves to move the inlet valve portion 48 toward a position spaced from the valve seat member 35 to establish pressure fluid flow from the inlet to the outlet ports 39, 40 and therefrom through the conduit 15 to actuate the servo motor or brake assembly 16 associated therewith. This established pressure fluid also flows through the cross-passage 55 and the axial passage 56 of the valve element 44 into the expansible fluid pressure chamber 104 where said fluid pressure acts on the upper end of the valve control member 97 to establish an application force thereon urging said valve control member downwardly. This downward movement of the valve control member 97 serves to sealably engage the valve seat 102 with the outlet valve portion 92 thereby interrupting pressure fluid communication between the outlet and exhaust ports 79, 77 and urges the inlet valve portion 88 toward a position spaced from the valve seat member 74 to establish pressure fluid flow from the inlet port 78 to the outlet port 79 and therefrom through the conduit 22 to energize the servo motor or brake assembly 23 associated therewith substantially simultaneously with the energization of the brake assembly 16.

Since the opposed ends of the valve element 44 and the lower end of the valve control member 57 are acted upon by the established fluid pressure at the outlet port 40 and in the expansible fluid pressure chamber 104, a reaction force is developed which is equivalent to the established fluid pressure acting on the area of said valve control member across the seal 59. This reaction force is in opposition to the operator-applied force and when said forces are equal the valve control member 57 is moved upwardly against the metering spring 64 to a position wherein the inlet valve portion 48 is positioned in lapped engagement with the valve seat member 35 and the outlet valve portion 52 is in lapped engagement with the valve seat 62. The reaction force acting through the metering spring 64 against the operator-applied force affords the operator an accurate and direct "feel" as to the extent of the braking effort or application.

Similarly, since the fluid pressures at the outlet port 79 and in the fluid pressure chamber 87 are the same, the effective area of the valve control member 97 responsive to the established fluid pressure in the branch 10 is equivalent to the area defined across the seal 99, and this effective area is identical to the area across the seal 98 which is responsive to the established fluid pressure in the chamber 104. When the reaction force established by the fluid pressure at the outlet port 79 acting on the valve control member 97 across the seal 99 equals the application force established by the fluid pressure in the chamber 104 acting on said valve control member across the seal 98, the valve control member 97 is moved upwardly to a position wherein the inlet valve portion 88 is in lapped engagement with the valve seat member 74 and the outlet valve portion 92 is in lapped engagement with the valve seat 102. If greater breaking effort is desired, the operator-applied force is increased which results in an increased application force, and the component parts of the control valve 12 function in the same manner as previously described to again move said component parts to their lapped positions.

When the desired braking efforts is attained, the operator-applied force is removed from the push rod and application member 66, 65 so that the downward force on the valve control member 57 is eliminated, and the reaction force established on the lower end of said valve control member by the established fluid pressure in the branch 9 urges it upwardly, which upward movement is limited to the lower end thereof engaging the shoulder 34. Since the upward movement of the valve element 44 is restricted by the sealing portion 48 engaging the valve seat member 35, this upward movement of the valve control member 57 serves to disengage the valve seat 62 from the outlet sealing portion 52 and establish pressure fluid communication between the outlet and exhaust ports 40, 38 for the exhaustion of pressure fluid in the branch 9 from the exhaust port 38 through the conduit 17 to the reservoir 3. As the pressure fluid is exhausted from the outlet port 40, it is also exhausted from the expansible fluid pressure chamber 104 via the passages 56, 55 in the valve element 44 so that the application force on the valve control member 97 is eliminated permitting the reaction force established on said valve control member by the established fluid pressure in the branch 10 to urge said valve control member upwardly, which upward movement is limited by the enlarged head 103 thereon engaging the valve guide member 41. In the same manner as described hereinabove, this upward movement of the valve control member 97 serves to disengage the valve seat 102 from the outlet sealing portion 92 to establish pressure fluid communication between the outlet and exhaust ports 79, 77, and the exhaustion of pressure fluid in the branch 10 is thus effected by pressure fluid flow from the exhaust port 77 through the conduits 24, 17 to the reservoir 3.

It should be understood that the brakes connected with one branch of the fluid pressure system will remain operative if the other branch fails and that the operator will become aware of the defective branch due to the increased pedal stroke necessary to effect the braking application.

In the event of pressure fluid failure in the branch 10, the operator-applied force to the push rod and application member 66, 65 will operate as previously described to urge the valve control member 57 downwardly sealably engaging the valve seat 62 with the sealing portion 52 and disengaging sealing portion 48 from the valve seat member 35 to establish pressure fluid flow between the inlet and outlet ports 39, 40. As the established pressure fluid flows through the passages 55, 56 in the valve element 44 into the expansible fluid pressure chamber 104, the application force provided on the valve control member 97 is unopposed due to the failure to establish fluid pressure in the branch 10, and the enlarged head 103 is moved to a position engaging the shoulder 71 to limit the downward movement of said valve control member and to restrict further expansion of the chamber 104. Thereafter, the established pressure fluid flow between the inlet and outlet ports 39, 40 is not effected by the fluid pressure failure in the branch 10, and the fluid pressure in the branch 9 is effective to energize the servo motor or brake assembly 16 associated therewith, and the operator is provided with a direct and accurate "feel" as to the braking application by the reaction force established on the valve control member 57, as previously described. The lost pedal stroke which the operator feels when there has been a fluid pressure failure in the branch 10 is due to the increased force required to effect the braking application when only one of the brake assemblies is operative.

In the event of failure in the branch 9, the downward movement of the valve control member 57 and valve element 44 fails to establish pressure fluid flow in the branch 9 or into the chamber 104; therefore, a further downward or lost motion movement of the application member 65 is required which effects a lost motion connection or engagement between the lower end of the valve element 44 and the enlarged head 103 of the valve control member 97 to mechanically drive said valve control member and valve element 83 toward the position disengaging the inlet valve portion 88 from the valve seat member 74 to establish pressure fluid flow between the inlet and outlet ports 73, 74 and therefrom through the conduit 22 to energize the servo motor or brake assembly 23 associated therewith. The operator will be aware of this fluid pressure failure due to the slight increase in pedal stroke necessary to effect the engagement of the end of the valve element 44 with the enlarged head portion 103 and will still be provided with an accurate "feel" of braking effort through the reaction force established on the valve control member 97.

From the foregoing, it is now apparent that a novel control valve meeting the objects set out hereinbefore is provided and that changes or modifications to the precise configurations, shapes or details of the construction set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing having a pair of port sets therein, each port set including inlet and outlet ports, a pair of valve means controlling pressure fluid communication between the ports of said port sets, respectively, valve control means movable in said housing including exhaust passage means for connection with the outlet port of one of said port sets, and an exhaust valve seat in circumscribing relation with said exhaust passage means for sealing engagement with one of said valve means, said valve control means being movable in response to and applied force to sealably engage said exhaust valve seat with said one valve means closing said exhaust passage means and thereafter move said one valve means toward a position establishing pressure fluid communication between the inlet and outlet ports of said one port set, other valve control means movable in said housing and defining therewith an expansible fluid pressure chamber, said other valve control means including other exhaust passage means for connection with the outlet port of the other of said port sets, and another exhaust valve seat in circumscribing relation with said other exhaust passage means for sealing engagement with the other of said valve means, and connecting passage means in said one valve means connecting the outlet port of said one port set in pressure fluid communication with said chamber, said other valve control means being movable in response to establish fluid pressure in said chamber to sealably engage said other exhaust valve seat with said other valve means closing said other exhaust passage means and thereafter move said other valve means toward a position establishing pressure fluid communication between the inlet and outlet ports of said other port set.

2. The control valve according to claim 1, comprising a first reaction area on said one valve control member responsive to the established fluid pressure at the outlet port of said one port set for establishing a first reaction force in opposition to the applied force thereon, an actuating area on said other valve control member responsive to the established fluid pressure in said chamber for establishing an actuating force to actuate said other valve control member, and a second reaction area on said other valve control member opposed to said actuating area and responsive to the established fluid pressure at the outlet port of said other port set for establishing a second reaction force in opposition to the actuating force.

3. The control valve according to claim 2, comprising a lost motion connection between said one valve means and other valve control means, said lost motion connection between effected upon the applied force actuation of said first named valve control means and one valve means to mechanically drive said other valve control means and actuate said other valve means in the event of fluid pressure failure at the outlet port of said one port set wherein the second reaction force is transmitted through said lost motion connection in opposition to the applied force.

4. The control valve according to claim 1, including opposed abutment surfaces on said housing within said chamber, said other valve control means having an enlarged head portion movable in said chamber and between said opposed abutment surfaces for displacement limiting engagement therewith.

5. The control valve according to claim 1, including a third and fourth valve seats on said husing intermediate said inlet and outlet ports of said one and other port sets said one and other valve means each comprising a pair of concentric valve members concertedly movable in said housing, one of said valve members of said one and other valve means beng normally engaged with said third and fourth valve seats for interrupting pressure fluid communication between said inlet and outlet ports of said one and other port sets, and the other of said valve members of said one and other valve means being engageable with said first named and other exhaust valve seats.

References Cited

FOREIGN PATENTS 811,466   4/1959   Great Britain.

MILTON BUCHLER, *Primary Examiner.*

J. McLAUGHLIN, *Assistant Examiner.*

UNITED STATES PATENT OFFICE
CERTIFICATE OF CORRECTION

Patent No. 3,366,424                        January 30, 1968

Norman E. Edwards

It is hereby certified that error appears in the above numbered patent requiring correction and that the said Letters Patent should read as corrected below.

Column 4, line 33, for "seal" read -- seal 82 --; column 8, line 27, for "and" read -- an --; line 43, for "establish" read -- established --; line 65, for "between" read -- being --; column 9, line 5, strike out "a"; same line 5, for "husing" read -- housing --; line 6, for "sets" read -- sets, --; line 10, for "beng" read -- being --.

Signed and sealed this 18th day of March 1969.

(SEAL)
Attest:

Edward M. Fletcher, Jr.                       EDWARD J. BRENNER
Attesting Officer                              Commissioner of Patents